United States Patent
Kim

(10) Patent No.: US 9,628,678 B2
(45) Date of Patent: Apr. 18, 2017

(54) CAMERA MODULE AND PORTABLE TERMINAL WITH THE SAME

(75) Inventor: Sun Joo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 176 days.

(21) Appl. No.: 14/234,915

(22) PCT Filed: Sep. 14, 2012

(86) PCT No.: PCT/KR2012/007356
§ 371 (c)(1),
(2), (4) Date: Jan. 24, 2014

(87) PCT Pub. No.: WO2013/039342
PCT Pub. Date: Mar. 21, 2013

(65) Prior Publication Data
US 2014/0132831 A1    May 15, 2014

(30) Foreign Application Priority Data
Sep. 16, 2011  (KR) .......................... 10-2011-0093588

(51) Int. Cl.
| | | |
|---|---|---|
| *H04N 5/225* | (2006.01) | |
| *G03B 17/00* | (2006.01) | |
| *H01L 31/062* | (2012.01) | |
| *G03B 11/00* | (2006.01) | |
| *G02B 7/02* | (2006.01) | |
| *G02B 7/00* | (2006.01) | |

(52) U.S. Cl.
CPC ............ *H04N 5/2252* (2013.01); *G02B 7/021* (2013.01); *G03B 11/00* (2013.01); *G02B 7/006* (2013.01)

(58) Field of Classification Search
CPC .... H04N 5/225; H04N 5/2254; H04N 5/2253; H04N 5/2252; H01L 27/14625; H01L 27/14627
USPC ........ 348/373, 374, 340, 376; 257/294, 432, 257/680; 438/27, 65, 69; 396/529
See application file for complete search history.

(56) References Cited

U.S. PATENT DOCUMENTS

| | | | |
|---|---|---|---|
| 6,490,438 B1 * | 12/2002 | Wu ...................... | H04B 1/3833 361/816 |
| 2003/0122957 A1 * | 7/2003 | Emme .................. | H04N 5/2256 348/370 |
| 2004/0114919 A1 | 6/2004 | Rife | |
| 2004/0189862 A1 * | 9/2004 | Gustavsson ........ | G02B 13/0015 348/376 |
| 2005/0184219 A1 * | 8/2005 | Kirby ................ | H01L 27/14618 250/208.1 |
| 2005/0254358 A1 * | 11/2005 | Kosako ................ | H04N 5/2252 369/44.14 |
| 2006/0006486 A1 * | 1/2006 | Seo ......................... | H01L 24/97 257/433 |
| 2007/0030665 A1 * | 2/2007 | Shyu .................... | G02B 13/001 362/35 |

(Continued)

*Primary Examiner* — Xi Wang
(74) *Attorney, Agent, or Firm* — Birch, Stewart, Kolasch & Birch, LLP

(57) ABSTRACT

A camera module according to an exemplary embodiment of the present invention includes a PCB (Printed Circuit Board) mounted with an image sensor, a housing mounted therein with camera parts and configured to protect the image sensor, and one or more sheets of lenses mounted at the housing, wherein the a window of the one or more sheets of lenses is formed with an IR (infrared) filter.

8 Claims, 2 Drawing Sheets

(56) References Cited

U.S. PATENT DOCUMENTS

| | | |
|---|---|---|
| 2007/0058072 A1* | 3/2007 | Lee ................... H04N 5/2254 348/342 |
| 2007/0091198 A1* | 4/2007 | Watanabe ............ H04N 5/2254 348/340 |
| 2007/0241273 A1 | 10/2007 | Kim et al. |
| 2007/0285555 A1* | 12/2007 | Chen ................... H04N 5/2253 348/340 |
| 2009/0079863 A1 | 3/2009 | Aoki et al. |
| 2009/0252488 A1* | 10/2009 | Eromaki ................ G02B 7/102 396/529 |
| 2011/0149415 A1 | 6/2011 | Jeong |
| 2011/0159919 A1* | 6/2011 | Kim ....................... G02B 7/08 455/556.1 |

* cited by examiner

CAMERA MODULE AND PORTABLE TERMINAL WITH THE SAME

TECHNICAL FIELD

The teachings in accordance with exemplary embodiments of this invention relate generally to a camera module and a portable terminal mounted with the camera module.

BACKGROUND ART

A camera module captures an optical image of a subject through a lens using an image sensor, and converts the optical image or an optical signal into an electrical signal to form an image. The camera module performs a variety of functions by being mounted with various electronic devices including a portable terminal.

Meanwhile, the camera module is mounted with an infrared filter inside a holder of a housing. Thus, a camera module according to prior art suffers from a disadvantage of being difficulty in reducing a size of the camera module, because an inner space as much as a size of the infrared filter is required.

DISCLOSURE OF INVENTION

Technical Problem

Accordingly, embodiments of the present invention may relate to a camera module that substantially obviates one or more of the above disadvantages/problems due to limitations and disadvantages of related art, and it is an object of the present invention to provide a camera module configured to dispense with an IR (infrared) filter, whereby parts can be miniaturized, structure can be simplified and an assembly process can be simply performed, and a portable terminal mounted with the camera module.

Technical problems to be solved by the present invention are not restricted to the above-mentioned description, and any other technical problems not mentioned so far will be clearly appreciated from the following description by skilled in the art.

Solution to Problem

In order to accomplish the above object, in one general aspect of the present disclosure, there is provided a camera module, the camera module comprising: a PCB (Printed Circuit Board) mounted with an image sensor; a housing mounted therein with camera parts and configured to protect the image sensor; and one or more sheets of lenses mounted at the housing, wherein a window of the one or more sheets of lenses is formed with an IR (infrared) filter.

Preferably, but not necessarily, the IR filter may be formed at a window cover positioned at the window.

Preferably, but not necessarily, the window cover may be formed at the camera module.

Preferably, but not necessarily, the window cover may be formed at a case embedded in the camera module.

Preferably, but not necessarily, the window cover formed with the IR filter may include a transparent cover, and an IR filter coated on the transparent cover.

Preferably, but not necessarily, the IR filter may be coated on a front surface of the transparent cover.

Preferably, but not necessarily, the IR filter may be coated on a rear surface of the transparent cover.

Preferably, but not necessarily, the camera module may further comprise a shield can.

Preferably, but not necessarily, the camera module may further comprise a heat radiating material filled between the housing and the shield can.

Preferably, but not necessarily, the heat radiating material may be a heat radiating silicone.

Preferably, but not necessarily, the case may be an EMI (Electromagnetic Interference) case.

In another general aspect of the present invention, there is provided a portable terminal, the portable terminal being configured in such a manner that an opening is formed at a case for functioning as an optical path of an object, the opening is mounted with a cover included with an IR (infrared) filter, and a portable terminal is formed opposite to the cover including the IR filter.

Preferably, but not necessarily, the camera module may include a housing embedded with a lens, a PCB (Printed Circuit Board) bonded to the housing, and an image sensor mounted on the PCB and positioned inside the housing.

Preferably, but not necessarily, the camera module may further include a shield can, and a heat radiating material filled between the housing and the shield can.

Preferably, but not necessarily, the heat radiating material may be a heat radiating silicone.

Preferably, but not necessarily, the cover included with the IR filter may include a transparent cover, and an IR filter coated on the transparent cover.

Preferably, but not necessarily, the IR filter may be coated on a front surface of the transparent cover.

Preferably, but not necessarily, the IR filter may be coated on a rear surface of the transparent cover.

Advantageous Effects of Invention

A camera module according to the present invention has an advantageous effect in that an IR (infrared) filter is not installed inside the camera module to simplify parts, to simplify structure, whereby an assembly process can be simply performed.

Another advantageous effect is that a heat-radiating material is filled between a case and a housing to prevent a pollution material from penetrating into the camera module from outside, and to absorb or alleviate the stress such as shock and vibration.

Still another advantageous effect is that a window of a case is attached with a cover included with an IR filter to prevent foreign objects from entering a camera module, and to dispense with an IR filter inside a housing, whereby parts of the camera module can be simplified, structure is simplified and an assembly process can be simply performed.

Still further advantageous effect is that an opening serving as an optical path of an object is formed at a case of a portable terminal, a cover included with an IR filter is mounted at the opening, and a camera module is mounted opposite to the cover included with the IR filter, whereby the IR filter is not existent inside the camera module to make the camera module miniaturized, such that, in a case the camera module is mounted on a portable terminal, a degree of freedom for inside space of the portable terminal can be enhanced by the miniaturized camera module.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

Figure 1:
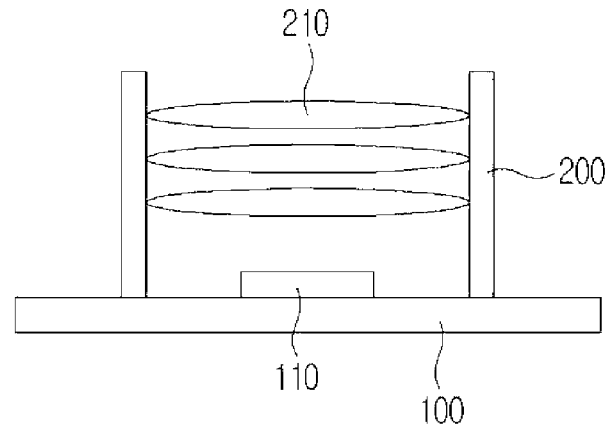
FIG. 1 is a schematic cross-sectional view illustrating a camera module according to a first exemplary embodiment of the present invention.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thereafter," "then," "next," "therefore", etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

The term 'portable terminal', as used herein, may indicate a mobile phone, a smart phone, a laptop computer, a digital broadcast receiver, a personal digital assistant (PDA), a portable multimedia player (PMP), a camera, a navigation device, a tablet computer, or an electronic book (e-book) reader. In the present invention, the terms module and unit may be interchangeably used.

The portable terminal of the present invention may be applied to nearly all types of mobile terminals such as a folder-type, a bar-type, a swing-type and a slider-type mobile terminal.

Now, the camera module and portable terminal with the same according to exemplary embodiments of the present invention will be described in detail with reference to the accompanying drawings.

Figure 2:
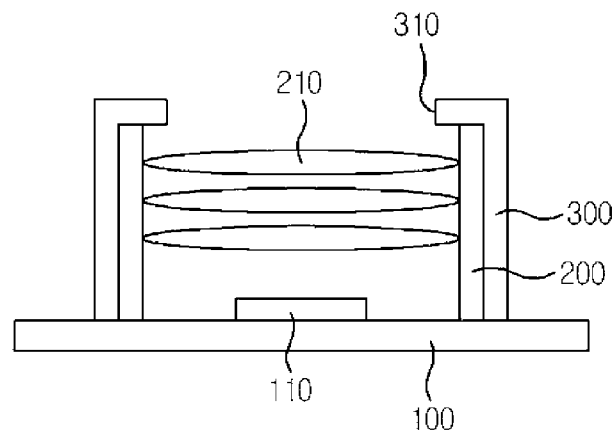
FIG. 2 is a schematic cross-sectional view illustrating a camera module according to a second exemplary embodiment of the present invention.

FIG. 1 is a schematic cross-sectional view illustrating a camera module according to a first exemplary embodiment of the present invention, and FIG. 2 is a schematic cross-sectional view illustrating a camera module according to a second exemplary embodiment of the present invention.

The camera module according to a first exemplary embodiment of the present invention includes a housing (200) embedded with a lens (210), a PCB (Printed Circuit Board, 100) bonded with the housing (200), and an image sensor (110) mounted with the PCB (100) and positioned inside the housing (200).

Thus, the camera module according to a first exemplary embodiment of the present invention is advantageous due to the fact that an IR (infrared) filter is not installed inside the camera module to simplify parts, to simplify structure, whereby an assembly process can be simply performed.

At this time, the housing (200) is formed with a lens (210) that is exposed, and an optical image of an object is received through the exposed lens (210).

Now, referring to FIG. 2, the camera module according to a second exemplary embodiment of the present invention is formed with a window (310) exposing the lens (210), and includes a case (300) embedded with the housing (200) and bonded to the PCB (100).

Therefore, the camera module according to an exemplary embodiment of the present invention includes a PCB mounted with an image sensor, a housing mounted therein with camera parts for protecting the image sensor, and one or more sheets of lenses mounted at the housing, where a window of the one or more sheets of lenses may be formed with an IR (infrared) filter. Furthermore, the IR filter may be formed at a window cover positioned at the window. Still furthermore, the window cover may be formed at the camera module, and the window cover may be formed at a case that contains the camera module. The camera module may further include a shield can.

Figure 3:
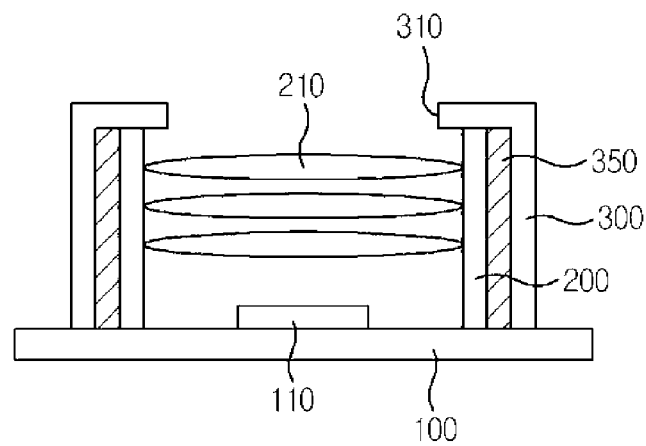
FIG. 3 is a schematic cross-sectional view illustrating a camera module according to a third exemplary embodiment of the present invention.
Figure 4:
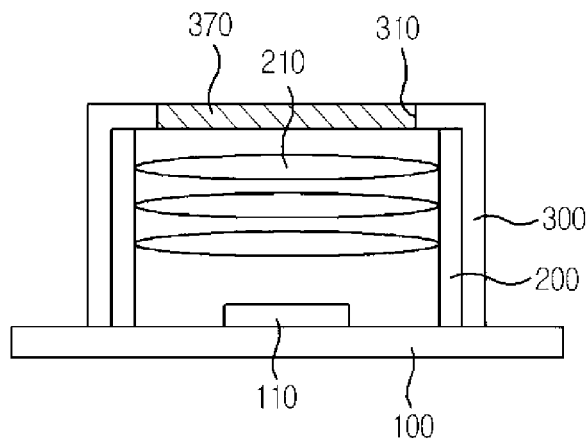
FIG. 4 is a schematic cross-sectional view illustrating a camera module according to a fourth exemplary embodiment of the present invention.

FIG. 3 is a schematic cross-sectional view illustrating a camera module according to a third exemplary embodiment of the present invention, and FIG. 4 is a schematic cross-sectional view illustrating a camera module according to a fourth exemplary embodiment of the present invention.

The camera module according to a third exemplary embodiment of the present invention includes a heat radiating material (350) filled between the housing (200) and the case (300), in addition to the structure of the camera module according to the second exemplary embodiment of the present invention, where the case (300) may be an EMI (Electromagnetic Interference) case.

That is, the third exemplary embodiment of the present invention is configured such that the heat radiating material (350) prevents the camera module from being influenced by an external heat to thermally insulate the camera module.

To be more specific, in a case a CPU (Central Processing Unit) is available about the camera module, the camera module may be influenced by heat radiated by the CPU, where the camera module is protected by the heat-radiating material (350) against the heat in the third exemplary embodiment of the present invention. Furthermore, the heat-radiating material (350) may be a heat-radiating silicone.

As noted from the foregoing, the camera module according to the third exemplary embodiment of the present invention is configured such that the heat radiating silicone is filled between the housing (200) and the case (300) to prevent a pollution material from penetrating into the camera module from outside, and to absorb or alleviate the stress such as shock and vibration.

At the same time, the camera module according to the second exemplary embodiment of the present invention is configured such that an opening is formed at the case (300), whereby the heat-radiating material can be filled in through the opening after all parts including the case (300) are assembled. Furthermore, the camera module according to the fourth exemplary embodiment of the present invention is configured such that the window (310) exposing the lens (210) is formed at the case (300), and the window (310) is attached with a cover (370) including the IR filter.

That is, the camera module according to the second and fourth exemplary embodiments of the present invention is such that the cover (370) included with the IR filter may be attached to the window (310) of the case (300).

Thus, the camera module according to the exemplary embodiment of the present invention is configured such that the cover (370) included with the IR filter can be attached to the window (310) of the case (300) to prevent foreign objects from entering the camera module, and to dispense with an IR filter inside the housing, whereby parts of the camera module can be simplified, structure is simplified and an assembly process can be simply performed.

Figure 5A:
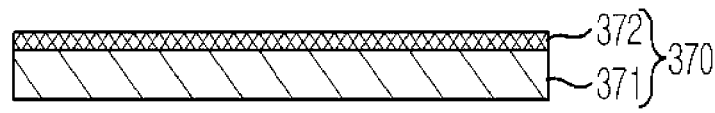
FIGS. 5*a* and 5*b* are schematic cross-sectional view illustrating a cover of a camera module according to the fourth exemplary embodiment of the present invention.
Figure 5B:
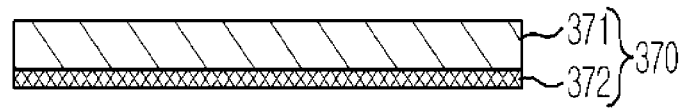

FIGS. 5a and 5b are schematic cross-sectional view illustrating a cover of a camera module according to the fourth exemplary embodiment of the present invention.

The camera module according to the fourth exemplary embodiment of the present invention relates to a cover (370) included with an IR filter mounted to the window of the case. That is, the cover (370) included with the IR filter may include a transparent cover (371), and an IR filter (372) coated on the transparent cover (371). The IR filter (372) may be coated on a front surface of the transparent cover. Furthermore, the IR filter (372) may be coated on a rear surface of the transparent cover.

Mode for the Invention

Figure 6:
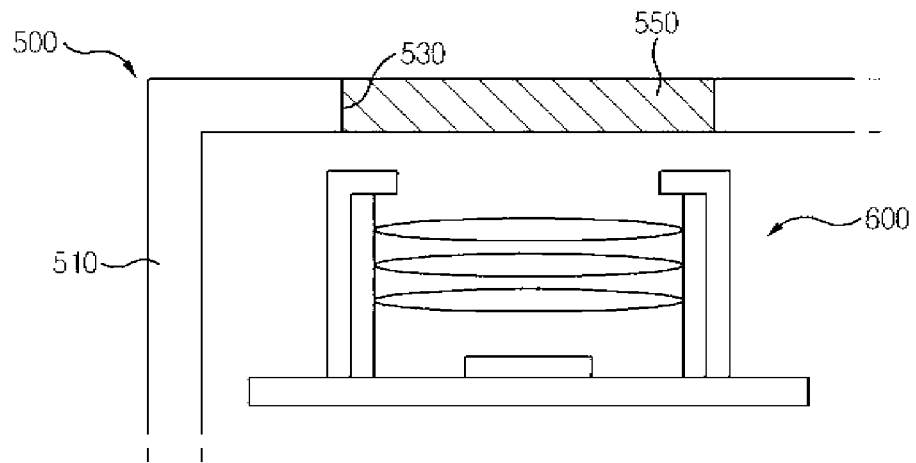
FIG. 6 is a partial cross-sectional view illustrating a portable terminal mounted with a camera module according to an exemplary embodiment of the present invention.

FIG. 6 is a partial cross-sectional view illustrating a portable terminal mounted with a camera module according to an exemplary embodiment of the present invention.

The foregoing camera module according to the first, second and third exemplary embodiments of the present invention is not mounted with an IR filter inside the housing. The foregoing camera module according to the first, second and third exemplary embodiments of the present invention may be utilized by being mounted at a portable terminal.

At this time, referring to FIG. 6, a portable terminal (500) is configured such that an opening (530) is formed at a terminal case (510) functioning as an optical path of an object, the opening (530) is mounted with a cover (550) included with an IR (infrared) filter, and a camera module (600) module according to the first, second and third exemplary embodiments of the present invention is formed opposite to the cover (550) included with the IR filter.

Naturally, as a lens of the camera module (600) is formed opposite to the cover (550) included with the IR filter, the lens can receive an optical image of an object that has passed the cover (550) included with the IR filter. Thus, the camera module (600) module according to the exemplary embodiment of the present invention is not existent therein with an IR filter to make the camera module miniaturized, whereby, the portable terminal can be miniaturized to enhance a degree of freedom for inside space of the portable terminal.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The camera module according to exemplary embodiment of the present invention has an industrial applicability in that an IR (infrared) filter is not existent inside the camera module to enable a miniaturization of the camera module, such that, in a case the camera module is mounted on a portable terminal, foreign objects are prevented from entering the camera module, and due to no IR filter inside a housing, parts of the camera module can be simplified, structure is simplified and an assembly process can be simply performed.

The invention claimed is:

1. A portable terminal, the portable terminal comprising:
a terminal case;
   a camera module disposed within the terminal case;
   an opening formed at an upper plate of the terminal case for functioning as an optical path of an object; and
   a cover coupled with the terminal case and disposed at the opening, wherein the camera module includes a PCB (Printed Circuit Board), an image sensor disposed on the PCB, a housing disposed on an upper surface of the PCB, at least one lens mounted at the housing and a case accommodating the housing,
   wherein a heat radiating material is filled between the housing and the case, wherein the cover comprises a transparent cover fixed at the opening and a IR (infrared) filter disposed on a bottom surface of the transparent cover,
   wherein an upper surface of the transparent cover and an upper surface of the upper plate of the terminal case are disposed on one plane surface,
   wherein a bottom surface of the IR filter and a bottom surface of the upper plate of the terminal case are disposed on another plane surface, and
   wherein the IR filter is disposed at an upper side of the lens and spaced from the housing and the case.

2. The portable terminal of claim 1, wherein the case is an EMI (Electromagnetic Interference) case.

3. The portable terminal of claim 1, wherein the heat radiating material is a heat radiating silicone.

4. The portable terminal of claim 1, wherein three lenses are mounted on an inner surface of the housing, and
   wherein the three lenses are spaced from each other.

5. The portable terminal of claim 1, wherein the case comprises a lateral plate disposed on the upper surface of the PCB and the upper plate inwardly extended from an upper end of the lateral plate of the case, and
   wherein a bottom surface of the upper plate of the case is contacted with an upper surface of the housing.

6. The portable terminal of claim 5, wherein the heat radiating material is disposed between the housing and the lateral plate of the case.

7. The portable terminal of claim 1, wherein a diameter of the opening is shorter than a diameter of the lens.

8. The portable terminal of claim 1, wherein a diameter of the cover is longer than a diameter of the lens.

* * * * *